(12) United States Patent
Wend

(10) Patent No.: US 11,370,611 B2
(45) Date of Patent: Jun. 28, 2022

(54) AUTOMATED STORAGE SYSTEM HAVING GUIDED TRANSFER MEANS

(71) Applicant: KNAPP AG, Hart bei Graz (AT)

(72) Inventor: Michael Wend, Bielefeld (DE)

(73) Assignee: KNAPP AG, Bei Graz (AT)

( * ) Notice: Subject to any disclaimer, the term of this patent is extended or adjusted under 35 U.S.C. 154(b) by 229 days.

(21) Appl. No.: 16/770,590

(22) PCT Filed: May 15, 2019

(86) PCT No.: PCT/AT2019/060161
§ 371 (c)(1),
(2) Date: Jun. 5, 2020

(87) PCT Pub. No.: WO2019/217982
PCT Pub. Date: Nov. 21, 2019

(65) Prior Publication Data
US 2021/0163221 A1 Jun. 3, 2021

(30) Foreign Application Priority Data
May 15, 2018 (AT) .............................. A 50406/2018

(51) Int. Cl.
*B65G 1/04* (2006.01)
*B65G 1/08* (2006.01)
(52) U.S. Cl.
CPC ......... *B65G 1/0457* (2013.01); *B65G 1/0435* (2013.01); *B65G 1/08* (2013.01); *B65G 2201/0229* (2013.01)

(58) Field of Classification Search
CPC ...... B65G 1/0435; B65G 1/0457; B65G 1/08; B65G 2201/0229
See application file for complete search history.

(56) References Cited

U.S. PATENT DOCUMENTS 9,169,068 B2 * 10/2015 Wend ................. B65G 1/08
2019/0210800 A1 * 7/2019 Holas ................ B65G 1/0457

FOREIGN PATENT DOCUMENTS

| AT | 516612 B1 | * | 7/2016 | ........... B65G 1/0414 |
| AT | 519265 B1 | * | 5/2018 | ........... B65G 1/0407 |
| DE | 102018105180 A1 | * | 9/2018 | |
| WO | WO-9104931 A | * | 4/1991 | ......... A47G 25/1442 |

* cited by examiner

*Primary Examiner* — Kaitlin S Joerger
(74) *Attorney, Agent, or Firm* — Jonathan Kidney; Intelink Law Group, P.C.

(57) ABSTRACT

An automated storage system with at least two racks with storage places for storing hanging goods, the hanging goods are storable being suspended using storage rails. A rack aisle is formed by the racks, in which a level rack operating device is longitudinal movable. The level rack operating device has a transfer means and a drive unit, firmly connected to the level rack operating device, in order to store at least one hanging item transported by the level rack operating device from the level rack operating device onto the storage rail/place of one of the storage places during a transfer process and/or to retrieve at least one hanging item from the storage rail/place onto the level rack operating device. Each storage place has a guide for the transfer means, at least in sections, the transfer means contacting the guide, at least in sections, during storing and retrieval of hanging goods.

20 Claims, 4 Drawing Sheets

AUTOMATED STORAGE SYSTEM HAVING GUIDED TRANSFER MEANS

CROSS-REFERENCE TO RELATED APPLICATION(S)

This application is a U.S. National Stage application of PCT Application No. PCT/AT2019/060161, filed Aug. 1, titled "AUTOMATED STORAGE SYSTEM COMPRISING GUIDED TRANSFER MEANS," and claims the benefit and priority thereto, the contents of which are incorporated herein by reference.

FIELD

This invention relates to automated storage systems.

BACKGROUND

The document AT 516612 B1 discloses an automated storage system comprising racks with storage places for storing hanging goods. The hanging goods are stored in a suspended fashion in the storage places in storage rails so as to be displaceable in a storage direction. Rack aisles are provided between the racks, in which load handling means of the automated storage system can be moved in a longitudinal direction. The load handling means each have a transfer means formed by a telescopic element and a drive unit for driving the telescopic element, which drive unit is firmly connected to the load handling means, wherein the telescopic element is arranged on the load handling means transversely to the longitudinal direction.

During a transfer operation, the telescopic element can be used for storing hanging goods transported by the load handling means from the load handling means onto the storage rail of one of the storage places or for retrieving hanging goods from the storage rail of one of the storage places onto the load handling means. For this purpose, the telescopic element is extended into the storage places and withdrawn therefrom.

Due to the large depth of the storage places—up to two meters—and the narrow width of the load handling means, very long telescopic elements comprising several links are required for reaching all hanging goods on the storage rails of the storage places. In order to reliably prevent sagging of the telescopic element even after years of use, the telescopic element must meet very high mechanical requirements. On the one hand, the telescopic element must have a very stiff design and, on the other hand, it must have been manufactured very precisely so that as little play as possible arises between the links. However, the necessary high stiffness leads to a high weight of the telescopic element and thus also of the load handling means, resulting in increased wear of the driven components. Moreover, the drive means of the load handling means must be equipped with very powerful drive components in order to still be able to ensure sufficient acceleration of the load handling means for quick handling of storage and retrieval orders due to the higher mass and the associated increased mass inertia of the load handling means.

It is the object of the present invention to provide an automated storage system which overcomes the disadvantages of the prior art and in which the load handling means, in particular a level rack operating device, is configured as light-weight as possible.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form as a prelude to the more detailed description that is presented later.

According to the invention, the present object is achieved by an automated storage system having the features of the characterizing part of claim 1. Preferred embodiments of the invention constitute the subject-matter of the dependent claims.

The automated storage system according to the invention has a guide for each storage place, the guide being designed for guiding the transfer means, at least in sections, during the storing and retrieval of hanging goods. In addition, the transfer means is designed for contacting the guide, at least in sections, during the storing and retrieval of hanging goods. In sections means in this context that the transfer means does not have to be guided across an entire depth of the storage places by the guide during the storing and retrieval of hanging goods. For example, the guide can thus have a shorter design than the storage rail of one of the storage places, with the guide extending in the rear area of the storage place, viewed only from the rack aisle, and the transfer means thus being guided only in the rear area of the storage place during storing and retrieving. In addition, there is the possibility that the guide is subdivided into several sections and partial guides are thus formed, with the transfer means being guided by the guide only in the sections. The partial guides can either be interconnected or arranged separately. The guide provides the advantage that the transfer means can have a less stiff design, since the transfer means is guided by the guide during the storing and retrieval of hanging goods and is therefore also supported. As a result, the transfer means can have a much lighter design, as a result of which the weight of the load handling means or, respectively, of the level rack operating device can be reduced. Due to the low weight, not only is wear reduced, but it is also possible to use drive components for driving the load handling means which exhibit less power and are therefore cheaper to buy.

The drive unit of the transfer means is firmly connected to the load handling means, whereby the transfer means always remains mechanically connected to the load handling means during the storing and retrieval of hanging goods.

In this context, it should also be pointed out that the document AT 516612 B1 indeed discloses, in a further embodiment variant, a rail similar to the guide, which is arranged in the storage places, however, said rail does not serve for guiding a transfer means according to the present invention, but serves, in a pairwise arrangement, as a running rail for a storage and retrieval vehicle. The storage and retrieval vehicle is an autonomously moving unit and comprises a drive unit permanently installed in the storage and retrieval vehicle in order to be able to leave the load handling means entirely during the storing and retrieval of hanging goods in a storage place. The storage and retrieval vehicle does not remain mechanically connected to the load handling means during the storing and retrieval of hanging goods. In addition, it should be noted that an automated storage system comprising such a storage and retrieval vehicle also cannot be used for achieving the above-indicated object of the invention, since the weight of the load handling means is not reduced because of the large number of additional components of the storage and retrieval vehicle, but, on the contrary, is even increased due to the additional components.

Advantageously, the transfer means is formed by a flexible element, in particular a chain, a belt or a band. The drive unit can be formed, for example, by an electric motor with a simple chain wheel or a drive pulley acting on the flexible element. Advantageously, a storage facility for the flexible element is provided on the load handling means in order to securely store the flexible element during a run of the load handling means between individual storage places or transfer stations for the transfer of the hanging goods. The storage facility can be formed, for example, by a simple round or polygonal-shaped open or closed tube in which the transfer means is accommodated, or by a roll storage system in which the flexible element is rolled up. Thus, very few components are necessary for the manipulation of the flexible element, which, in combination with the low weight of the flexible element, leads to a very low weight of the load handling means.

Furthermore, the guide is advantageously designed such that the flexible element can be inserted into and/or retracted from the guide while being driven by the drive unit and that the flexible element is guided along the guide during the insertion and/or retraction. The guide prevents the flexible element from escaping as it is pushed into the guide. In this case, the guide is suitably formed by a round or polygonal-shaped open or closed tube. The tube is preferably provided with a low-friction surface on its inside. In this context, an open tube is also regarded, for example, as a tube composed of two C-profiles defining a cavity, wherein the C-profiles can be arranged at a slight distance from each other. The tube is advantageously straight, but can also be curved, in particular in a serpentine fashion.

For storing hanging goods in a storage place and retrieving them therefrom, the load handling means is advantageously positioned very precisely opposite the storage place. The flexible element can be inserted into the guide without any offset due to the exact positioning. The positioning is advantageously affected by controlling the automated storage system. However, there is also the possibility that the guide has a funnel-shaped design on one end facing the rack aisle.

In a further embodiment variant, the transfer means is formed by a telescopic element which can be moved into and out of the storage places. The telescopic element preferably comprises several links which are displaced relative to each other during the process of moving into and out of the storage places as they are driven by the drive unit. The telescopic element has a guide element and at least one driving element in the front area, and the guide is formed by a guide rail. The guide rail is advantageously formed by a sheet metal which is bent into shape. The guide element is advantageously formed by a hook or a mounted roller and, at least temporarily, engages the guide rail during the storing and/or retrieval of hanging goods, whereby the telescopic element contacts the guide rail and is guided along the guide rail and is thus supported. For storing and/or retrieving hanging goods, the at least one driving element can be brought into contact with the hanging goods in such a way that the telescopic element, as it is moving out, shifts hanging goods from the load handling means into or onto the storage rail of one of the storage places and/or, as it is moving in, shifts hanging goods from the storage rail of one of the storage places onto the load handling means. The at least one driving element is advantageously formed by a snap mechanism or by an electrically or pneumatically operable mechanism. By guiding the telescopic element, the advantage is obtained that the telescopic element can have a very light-weight design, since sagging of the telescopic element in the extended state is reliably prevented by the guide.

Hanging goods can be, for example, clothing of any kind, bags, rucksacks, packages suspended on ropes, conveyor bags with all kinds of goods, etc.

Further advantageous embodiment variants of the automated storage system according to the invention are explained in further detail below on the basis of the figures.

DETAILED DESCRIPTION

Various features are described below, which, in some embodiments can be used independently or in combination with other features from other embodiments. These described embodiments are not to be construed as the only modes or embodiments possible, but are presented here to help explain how some of the inventive features are implemented.

Figure 1:
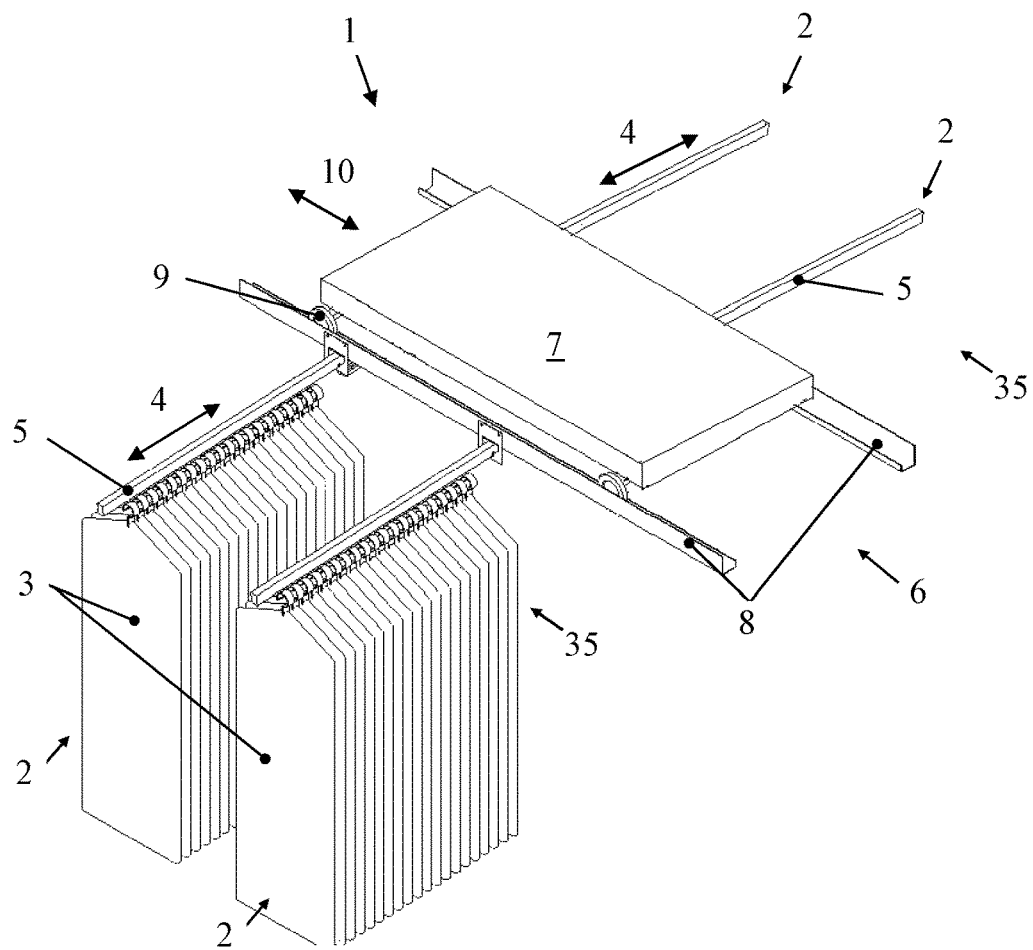
FIG. 1 shows a general structure of an automated storage system according to the invention in a schematic view.

FIG. 1 shows a general structure of an automated storage system 1 according to the invention in a schematic view, wherein all of the embodiment variants of the automated storage system according to the invention as illustrated and described in the further figures have the same general structure as illustrated in FIG. 1. The automated storage system 1 comprises two racks 35 (not shown in further detail) with storage places 2 for storing hanging goods 3. For reasons of clarity, only two storage places 2 per rack 35 are depicted, whereas a plurality of storage places 2 are provided per rack 35. The hanging goods 3 are stored in a suspended fashion in the storage places 2 in storage rails 5 so as to be displaceable in a storage direction 4. Each storage place 2 has a guide (not illustrated in FIG. 1).

Furthermore, the automated storage system 1 comprises a rack aisle 6 between the racks 35 and a load handling means 7 formed by a level rack operating device. The load handling means 7 has wheels 9 and is movable in the rack aisle 6 on running rails 8 in the longitudinal direction 10 while being driven by an electric motor (not shown). Using a transfer means (not shown) formed on the load handling means 7, a hanging item 3 transported by the load handling means 7 can be stored from the load handling means 7 onto the storage rail 5 of one of the storage places 2 and/or at least one hanging item 3 can be retrieved from the storage rail 5 of one of the storage places 2 onto the load handling means 7.

FIGS. 2 to 5 show a first embodiment variant of the automated storage system 11 according to the invention in various views. The automated storage system 11 according to the invention is constructed in accordance with the automatic storage system 1 illustrated in FIG. 1. Elements of the automated storage system 11 which are constructed equally as elements of the automated storage system 1 are provided with equal reference numerals.

Each storage place 2 of the storage system 11 has a guide 17a and a storage rail 5a. The guide 17a is formed by a closed square tube, and the storage rail 5a is formed by an open square tube, with the guide 17a and the storage rail 5a being connected to each other via a web 24. In this regard, see in particular FIG. 4. The hanging goods 3 can be pushed into the storage rails 5a in the storage direction 4 via sliding elements 20a or can be pushed out of the storage rail 5a in the storage direction 4. Advantageously, the sliding elements 20a have rollers in order to be able to be displaced in the storage rails 5a with as little friction as possible.

The guide 17a and the storage rail 5a are connected in each storage place 2 by a deflection element 19. The deflection element 19 is formed by a closed square tube bent by 180°. The storage rail 5a is inclined, with the storage rail 5a descending from the rack aisle 6 into the storage place 2 in order to enable hanging goods 3 to be stored in the storage place 2 in a gravity-driven manner. The inclination a of the storage rail 5a is advantageously between 3° and 10°, depending on the sliding elements 20a.

A load handling means 7a of the storage system 11 has a transfer means formed by a flexible element, specifically a chain 12. However, the flexible element can also be formed by a band or a belt. The chain 12 can be wound in any spatial direction and is mounted in a storage facility on the load handling means 7a in the longitudinal direction 10 of the load handling means 7a, the storage facility not being described in further detail. The storage facility can be formed, for example, by a simple square tube, which is screwed onto a frame of the load handling means 7a. For reasons of clarity, the frame of the load handling means 7a is not illustrated in FIG. 2.

Furthermore, the load handling means 7a comprises a drive unit, which is formed by an electric motor (not shown) and a chain wheel 13, the chain wheel 13 acting on the chain 12. In order to avoid slippage between the chain 12 and the chain wheel 13, a pressure wheel 14 is provided which presses the chain 12 against the chain wheel 13. The drive unit is screwed tightly to the frame of the load handling means 7a. The pressure wheel 14 is rotatably mounted on the frame of the load handling means 7a.

Figure 2:
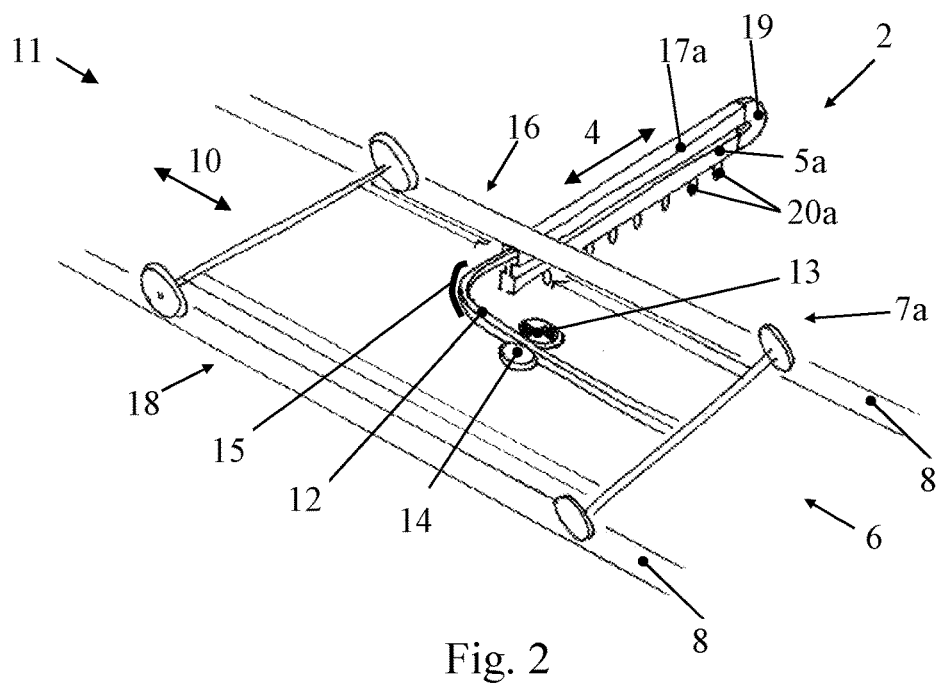
FIGS. 2 to 5 show a first embodiment variant of the automated storage system according to the invention in various views.
Figure 3:
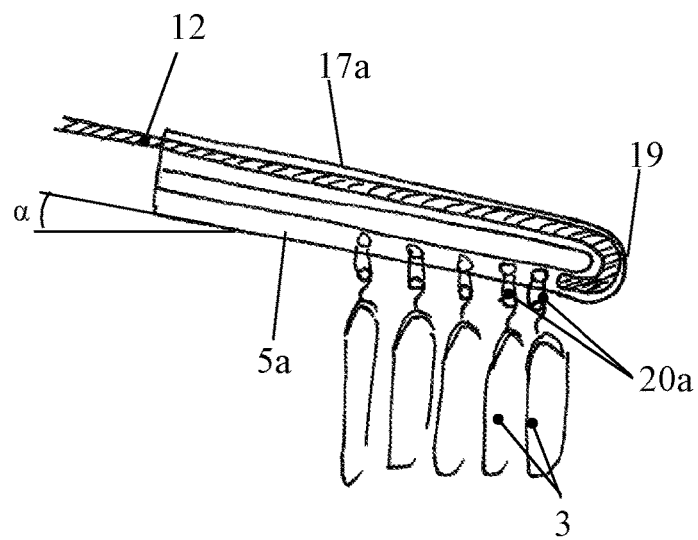
Figure 4:
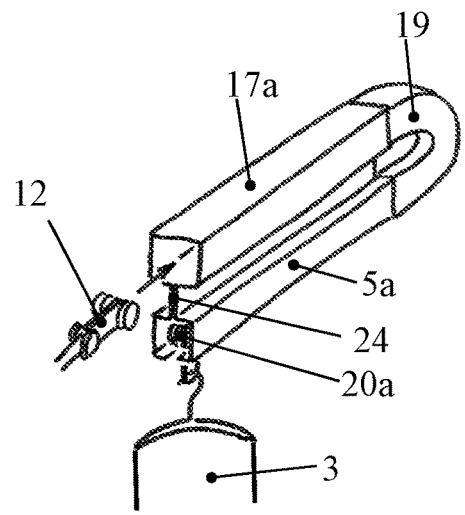
Figure 5:
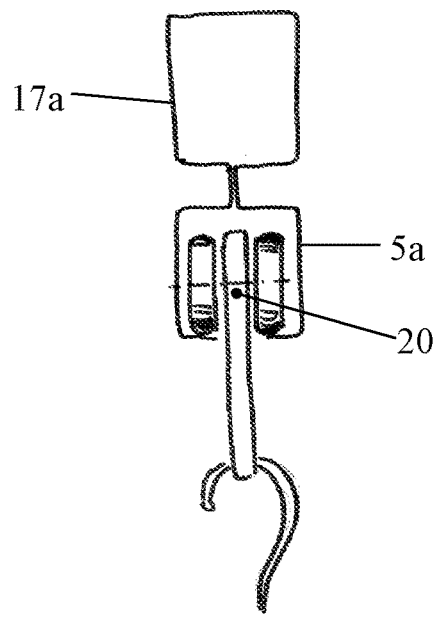

In addition, the load handling means 7a has a deflection guide 15, which deflects the chain 12 by 90° toward a side 16 of the rack aisle 6 in the direction of the storage place 2 arranged on the side 16. The deflection guide 15 is illustrated in FIG. 2 in a highly simplified manner, wherein the deflection guide 15 is advantageously formed by a square tube bent over by 90° and is screwed to the frame of the load handling means. It goes without saying that a second chain 12 can be provided for storage places 2 which are arranged on a different side 18 of the rack aisle 6, which second chain is accordingly deflected by a further deflection guide in the direction of the side 18. However, in a further embodiment variant, there is also the possibility that the deflection guide 15 is designed such that it can deflect the chain 12 either toward the side 16 or toward the side 18.

The load handling means 7a furthermore comprises a receiving rail (not shown) which is designed for accommodating the hanging goods 3 on the load handling means 7a. The cross-sectional design of the receiving rail equals that of the storage rail 5a. The receiving rail is either formed transversely to the longitudinal direction 10 on the load handling means 7a or is arranged in parallel to the chain 12 on the load handling means 7a.

Subsequently, a process of retrieving hanging goods 3 stored in the storage rail 5a according to an order is described in further detail. For retrieving hanging goods 3, the load handling means 7a, while being controlled by a control, is positioned according to the order opposite the storage place 2 in such a way that one end of the chain 12—depicted in FIG. 2 as already inserted into the guide 17a—can be inserted into the guide 17a. As a result, one end of the receiving rail (not shown) is also aligned with the storage rail 5a.

Subsequently, the chain 12 is pushed into the guide 17a while being driven by the drive unit. The deflection element 19 is designed for deflecting the chain 12 from the guide 17a into the storage rail 5a as soon as the latter has reached the end of the guide 17a. If the chain 12 continues to be fed into the guide 17a by the drive unit, the latter pushes the sliding elements 20a and thus the hanging goods 3 stored in the storage rail 5a from the storage rail 5a onto the receiving rail of the load handling means 7a. If the hanging item 3 requested according to the order is located on the load handling means 7a, the chain 12 is pulled out of the storage rail 5a, out of the deflection element 19 and out of the guide 17a by the drive unit. The load handling device 7a is again available for a further order and can either be moved to another storage place 2 or to a transfer station for transferring the hanging goods to a subsequent process or a further conveying system.

In a further embodiment variant of the automated storage system according to the invention, the load handling means 7a comprises a storing mechanism which is designed for pushing hanging goods 3 arranged on the receiving rail from the receiving rail into the storage rail 5a of a storage place 2, wherein, due to the inclination a of the storage rail 5a, the sliding elements 20a together with the hanging goods 3 slide into the storage place 2, as soon as they are located in the storage rail 5a. The inclination a of the storage rail 5a is advantageously adapted to a frictional resistance between the storage rail 5a and the sliding element 20a and to a weight of the hanging item 3.

Figure 6:
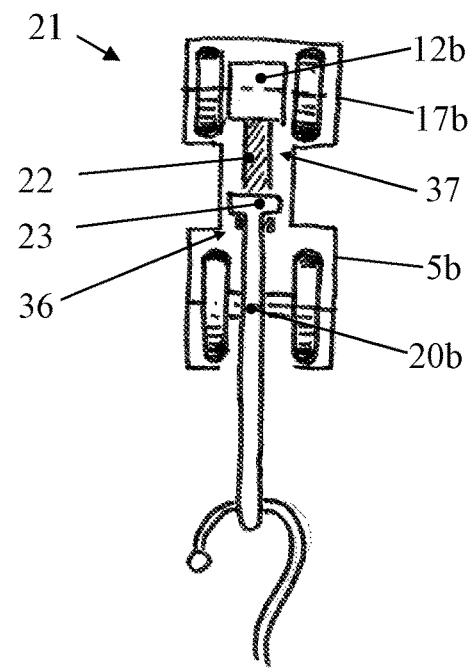
FIG. 6 shows a further embodiment variant of the automated storage system according to the invention in a sectional view.

FIG. 6 shows a further embodiment variant of the automated storage system 21 according to the invention in a sectional view. The automated storage system 21 differs from the storage system 11 according to FIGS. 2 to 5 in that the storage places 2 have no deflection elements. A guide 17b and a storage rail 5b of the storage places 2 are closed by lids at an end opposite the rack aisle 6 and are arranged in parallel to each other. The guide 17b is formed by a tube open on one side. The storage rail 5b is formed by a tube which is open on both sides, with an opening 36 of the storage rail 5b being attached to an opening 37 of the guide 17b.

In contrast to the automated storage system 11 according to FIGS. 2 to 5, a chain 12b of the automated storage system 21 additionally comprises a driving element, and a sliding element 20b of the automated storage system 21 additionally has an extension 23. The receiving rail and the chain 12b are guided in parallel to each another on the load handling means 7a.

The driving element is formed by a snap mechanism. The driving element has an actuating element 22 which is biased into a first position by a spring (not shown), the actuating element 22 protruding from the chain 12b in the first position. FIG. 6 shows the actuating element 22 in the first position. Viewed from the side, the actuating element has a triangular design and is rotatably mounted on a link of the chain 12.

If the chain 12b is now pushed into the guide 17b, the actuating element 22 folds back into a second position due to the triangular shape upon contact with the extensions 23 of the sliding elements 20b, as a result of which the actuating element 22 can be moved past the hanging goods 3 essentially without the hanging goods 3 being displaced. In this way, the chain 12b can be pushed completely into the guide 17b.

If the chain 12b is pulled out of the guide 17b, the actuating element 22 remains in the first position because of the spring preload. As a result, the sliding elements 20b and thus the hanging goods 3 are pushed from the storage rail 5b into the receiving rail of the load handling means 7a when the chain 12b is pulled out and are thus removed from the storage place 2. Also, in this embodiment variant, the storage rails 5b of the storage places 2 are designed to as to slope downward from the rack aisle 6 into the storage places 2.

In a further embodiment variant, the driving element is formed by an electrically or pneumatically operable actuating element, with the actuating element being displaceable between a first position, in which it protrudes from the chain 12b, and a second position, in which it essentially does not protrude from the chain 12b. In this embodiment variant, for storing and retrieving hanging goods 3, the driving element can be brought into contact with the hanging goods 3 in such a way that the chain 12b shifts the hanging goods 3 from the receiving rail of the load handling means 7a into the storage rail 5b of one of the storage places 2 while insertion into the guide 17b takes place and/or shifts the hanging goods 3 from the storage rail 5b of one of the storage places 2 onto the load handling means 7a while the flexible element is being pulled out of the guide 17b.

In a further embodiment variant, the chain 12b has a plurality of driving elements which are spaced apart from each other on the chain 12b.

In a further embodiment variant, the hanging goods 2 are hooked directly into the guide 17b without a sliding element 20b.

Figure 7:
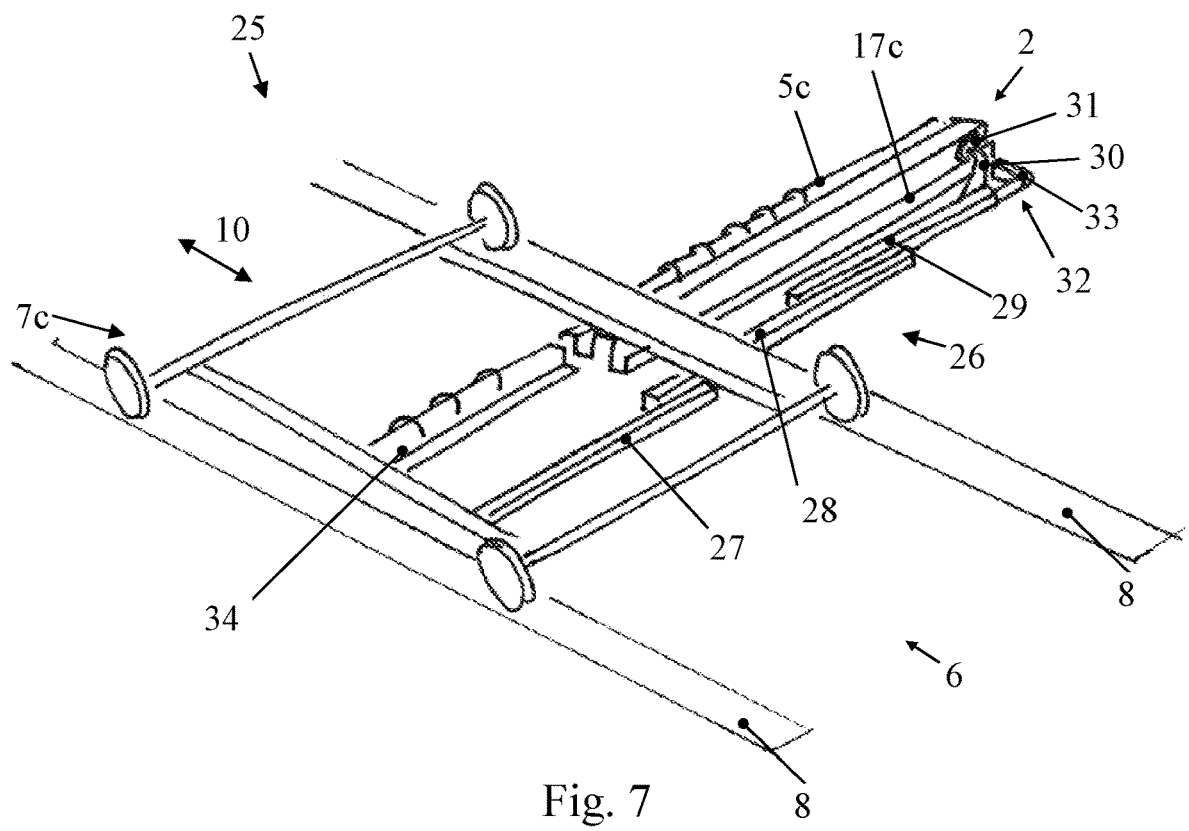
FIGS. 7 to 9 show a further embodiment variant of the automated storage system according to the invention in various views.
Figure 9:
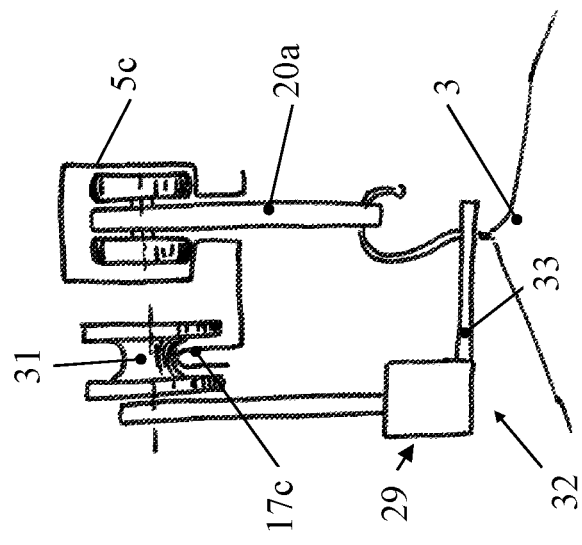
Figure 8:
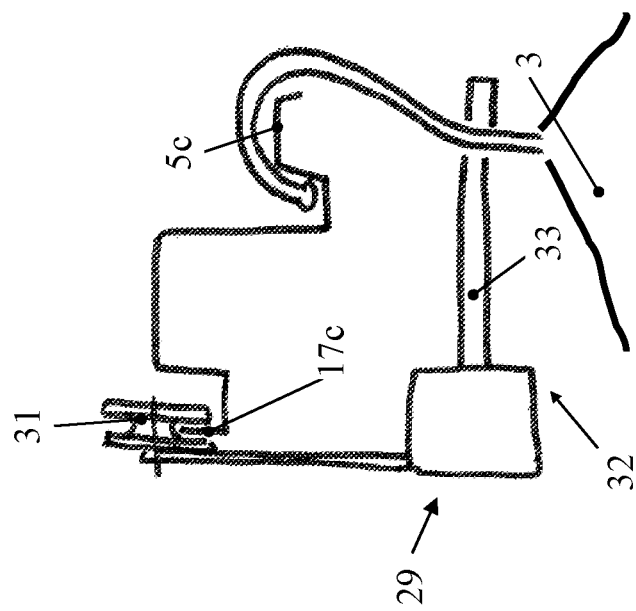

FIGS. 7 to 9 show a further embodiment variant of the automated storage system 25 according to the invention in various views. The storage system 25 according to the invention is constructed in accordance with the automated storage system 1 illustrated in FIG. 1. Elements of the automated storage system 25 which are constructed equally as elements of the automated storage system 1 are provided with equal reference numerals.

A load handling means 7c of the automated storage system 25 comprises a transfer element formed by a telescopic element 26, the transfer element comprising three links 27, 28 and 29, with the link 27 being screwed tightly to a frame of the load handling means 7c. For the sake of simplicity, the frame of the load handling means 7c is not illustrated in FIGS. 7 to 9. The other two links 28 and 29 can be moved into and out of a storage place 2 while being driven by a drive unit (not shown), with a guide element 30 being formed on the link 29. The guide element 30 comprises a roller 31.

Furthermore, a driving element 32 is formed on the link 29 in the front region of the telescopic element 26. The driving element 32 has an electrically operable actuating element 33, which can be positioned in a first position and a second position.

The load handling means 7c furthermore comprises a receiving rail 34, which is screwed to the load handling means 7c transversely to the longitudinal direction 10.

A storage rail 5c and a guide 17c are formed by a curved-shaped profile, the guide 17c being formed by a guide rail which contacts the roller 31 in the extended state of the telescopic element. In this regard, see in particular FIG. 8 or FIG. 9. However, there is also the possibility that the storage rail 5c and the guide 17c are formed by separate shaped profiles screwed, welded or glued to each other. The storage rail 5c in FIG. 9 is advantageously designed so as to be inclined, with the storage rail 5c descending from the rack aisle 6 into the storage place 2 in order to enable the hanging goods 3 to be stored in the storage place 2 in a gravity-driven manner. An inclination of the storage rail 5c is advantageously between 3° and 10°, depending on the sliding element 20a.

Subsequently, a process of retrieving hanging goods 3 arranged on the storage rail 5c and moving them onto the receiving rail 34 in accordance with an order is described in further detail. For retrieving hanging goods 3, the load handling means 7c, while being controlled by a control, is positioned according to the order opposite the storage place 2 in such a way that the receiving rail 34 is aligned with the storage rail 5c. The actuating element 33 is located in the second position.

Subsequently, the links 28 and 29 of the telescopic element 26 are pushed into the storage place 2 while being driven by the drive unit, with the roller 31 rolling on the guide 17c and the telescopic rod 26 being guided by the guide 17c and the actuating element 33 being moved past the hanging goods 3 without touching them. If the telescopic rod 26 is fully extended, the actuating element 33 is moved into the first position. The links 28 and 29 of the telescopic element 26 are now retracted. The hanging goods 3 are gripped by the actuating element 33 and pushed from the storage rail 5c onto the receiving rail 34. If the telescopic rod 26 is completely retracted, the load handling means 7c is again available for a further order and is able to head for another storage place 2 or a transfer station for transferring the hanging goods 3.

In a further embodiment variant of the automated storage system 25 according to the invention, the actuating element 33 is operated pneumatically.

In a further embodiment variant of the automated storage system 25 according to the invention, the driving element 32 is formed by a snap mechanism.

In a further embodiment variant of the automated storage system 25 according to the invention, the load handling means 7c comprises a second telescopic element which can be extended in the direction opposite to the telescopic element 26 in order to remove hanging goods 3 from storage places 2 on either side of the rack aisle 6.

In a further embodiment variant, the telescopic element 26 comprises a further driving element which is formed on the link 29 opposite the driving element 32. In this way, the advantage is obtained that hanging goods 3 can also be displaced from the receiving rail 34 of the load handling means 7c onto the storage rail 5c. Furthermore, in this embodiment variant, a telescopic element that can be extended on either side of the rack aisle 6 entails the possibility of storing or retrieving hanging goods 3 in storage places 2 on either side of the rack aisle 6. In this embodiment variant, the storage rails 5c can also be arranged horizontally in the storage places 2.

In a further embodiment variant, additional driving elements are formed on the link 29.

FIGS. 8 and 9 show two different embodiment variants of storage rails 5c in detail. The storage rail 5c in FIG. 8 is formed by a lip into which the hanging goods 3 can be hooked directly, wherein the storage rail 5c is not inclined in this embodiment variant, that is to say, it is designed essentially horizontally. The storage rail 5c in FIG. 9 is formed by an open tube into which the hanging goods 3 are hooked via a sliding element 20a.

In this regard, it should also be pointed out that, in a particularly simple embodiment variant of the automated storage system, there is the possibility of the guide being formed by the storage rail. The storage rail is advantageously designed so as to be inclined in combination with sliding elements 20a, with the storage rail descending from the respective storage place in the direction of the rack aisle in order to enable the hanging goods to be retrieved onto a receiving rail of the load handling device in a gravity-driven manner. The guide and the receiving rail are each formed by a simple open tube, and the transfer means is formed by a flexible element, the receiving rail advantageously being designed in such a way that it provides space for the hanging goods and accommodates the flexible element on the load handling means, guiding it therein. The storage rail comprises a stop mechanism at an end facing the rack aisle, which prevents hanging goods from sliding out of the storage rails in an uncontrolled manner. The stop mechanism is advantageously designed such that it enables hanging goods to be stored at any time, but allows retrieval only upon activation of the stop mechanism. The stop mechanism can be formed, for example, by an unlockable snap mechanism. For storing hanging goods in one of the storage places, the load handling means is positioned opposite the storage place in such a way that the receiving rail is aligned with the guide and the hanging goods can be pushed by the flexible element from the storage rail of the load handling means into the guide, while being driven by the drive unit. For retrieving hanging goods from one of the storage places, the load handling means is positioned opposite the guide in such a way that the receiving rail is aligned with the guide and the stop mechanism can be unlocked, causing the hanging goods stored in the guide to slide into the receiving rail of the load handling means under the effect of gravity.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An automated storage system comprising:
   at least two racks with storage places for storing hanging goods, wherein the hanging goods are storable in a suspended fashion in the storage places in storage rails so as to be displaceable in a storage direction, and
   a rack aisle formed by the at least two racks, in which a level rack operating device is movable in a longitudinal direction, with the level rack operating device having a transfer means and a drive unit for driving the transfer means, which drive unit is firmly connected to the level rack operating device, in order to store at least one hanging item transported by the level rack operating device from the level rack operating device onto the storage rail of one of the storage places with the transfer means during a transfer process and/or to retrieve at least one hanging item from the storage rail of one of the storage places onto the level rack operating device, wherein
   each storage place has a guide, the guide being designed for guiding the transfer means, at least in sections, during the storing and retrieval of hanging goods, and that the transfer means is designed for contacting the guide, at least in sections, during the storing and retrieval of hanging goods.

2. The automated storage system according to claim 1, wherein the transfer means is formed by a flexible element, in particular a chain, a belt or a band, that the guide is designed such that the flexible element can be inserted into and/or retracted from the guide while being driven by the drive unit and that the guide is designed such that the flexible element is guided along the guide during the insertion and/or retraction.

3. The automated storage system according to claim 2, wherein the guide is formed by a round or polygonal-shaped open or closed tube.

4. The automated storage system according to claim 2, wherein the guide and the storage rail are connected in each storage place by a deflection element, the deflection element being designed for deflecting the flexible element from the guide into the storage rail in order to push hanging goods stored in the storage rail from the storage rail onto the level rack operating device for retrieval.

5. The automated storage system according to claim 2, wherein the guide and the storage rail are arranged in parallel to each other and that the flexible element has at least one driving element, wherein, for storing and retrieving hanging goods, the at least one driving element can be brought into contact with the hanging goods in such a way that the flexible element, while being inserted into the guide, shifts the hanging goods from the level rack operating device into or onto the storage rail of one of the storage places and/or, during the extraction of the flexible element from the guide, shifts the hanging goods from the storage rail of one of the storage places onto the level rack operating device.

6. The automated storage system according to claim 1, wherein the transfer means is formed by a telescopic element movable into and out of the storage places, which comprises a guide element and, in the front area, at least one driving element, and that the guide is formed by a guide rail, wherein the guide element at least temporarily engages the guide rail during the storing and/or retrieval of hanging goods, thus guiding the telescopic element along the guide rail, and wherein, for storing and/or retrieving hanging goods, the at least one driving element can be brought into contact with the hanging goods in such a way that the telescopic element, as it is moving out, shifts the hanging goods from the level rack operating device into or onto the storage rail of one of the storage places and/or, as it is moving in, shifts the hanging goods from the storage rail of one of the storage places onto the level rack operating device.

7. The automated storage system according to claim 6, wherein the guide element is formed by at least one roller rolling on the guide rail.

8. The automated storage system according to claim 5, wherein the at least one driving element is formed by a snap mechanism or by an electrically or pneumatically operable mechanism.

9. The automated storage system according to claim 1, wherein the storage rails are inclined, with the storage rails descending from the rack aisle into the storage places in order to enable the hanging goods to be stored in a gravity-driven manner.

10. The automated storage system according to claim 1, wherein the sliding elements are provided via which the hanging goods can be pushed into the storage rails in the storage direction and can be pushed out of the storage rails.

11. The automated storage system according to claim 10, wherein the sliding elements comprise rollers for being displaced in the storage rails.

12. The automated storage system according to claim 3, wherein the guide and the storage rail are connected in each storage place by a deflection element, the deflection element being designed for deflecting the flexible element from the guide into the storage rail in order to push hanging goods stored in the storage rail from the storage rail onto the level rack operating device for retrieval.

13. The automated storage system according to claim 3, wherein the guide and the storage rail are arranged in parallel to each other and that the flexible element has at least one driving element, wherein, for storing and retrieving hanging goods, the at least one driving element can be brought into contact with the hanging goods in such a way that the flexible element, while being inserted into the guide, shifts the hanging goods from the level rack operating device into or onto the storage rail of one of the storage places and/or, during the extraction of the flexible element from the guide, shifts the hanging goods from the storage rail of one of the storage places onto the level rack operating device.

14. The automated storage system according to claim 6, wherein the at least one driving element is formed by a snap mechanism or by an electrically or pneumatically operable mechanism.

15. The automated storage system according to claim 7, wherein the at least one driving element is formed by a snap mechanism or by an electrically or pneumatically operable mechanism.

16. The automated storage system according to claim 2, wherein the storage rails are inclined, with the storage rails descending from the rack aisle into the storage places in order to enable the hanging goods to be stored in a gravity-driven manner.

17. The automated storage system according to claim 3, wherein the storage rails are inclined, with the storage rails descending from the rack aisle into the storage places in order to enable the hanging goods to be stored in a gravity-driven manner.

18. The automated storage system according to claim 4, wherein the storage rails are inclined, with the storage rails descending from the rack aisle into the storage places in order to enable the hanging goods to be stored in a gravity-driven manner.

19. The automated storage system according to claim 2, wherein the sliding elements are provided via which the hanging goods can be pushed into the storage rails in the storage direction and can be pushed out of the storage rails.

20. The automated storage system according to claim 3, wherein the sliding elements are provided via which the hanging goods can be pushed into the storage rails in the storage direction and can be pushed out of the storage rails.

\* \* \* \* \*